Dec. 23, 1969 YUJI KIUCHI ET AL 3,486,059

HIGH SENSITIVITY PHOTOCONDUCTOR FOR IMAGE PICKUP TUBE

Filed Jan. 10, 1967

INVENTORS:

YUJI KIUCHI & KAZUO SHIMIZU

BY Stephen H. Frishauf

Atty

United States Patent Office 3,486,059
Patented Dec. 23, 1969

3,486,059
HIGH SENSITIVITY PHOTOCONDUCTOR FOR IMAGE PICKUP TUBE
Yuji Kiuchi and Kazuo Shimizu, Yokohama-shi, Japan, assignors to Tokyo Shibaura Electric Co., Ltd., Kawasaki-shi, Japan, a corporation of Japan
Filed Jan. 10, 1967, Ser. No. 608,349
Claims priority, application Japan, Jan. 11, 1966, 41/1,089; Jan. 12, 1966, 41/1,272; Apr. 27, 1966, 41/26,394
Int. Cl. H01j 31/26
U.S. Cl. 313—65 3 Claims

ABSTRACT OF THE DISCLOSURE

A photoelectric conductor comprises a photoelectric conductor material selected from a group consisting of cadmium sulphide, cadmium selenide, cadmium telluride and solid solutions containing at least two of these compounds. The photoconductor further includes a first impurity consisting of at least one element of the Group I*b* of the periodic table and a second impurity comprising at least one member selected from a group consisting of thallium, tin, lead, antimony, bismuth. The photoelectric conductor is suitable for use in image pickup tubes.

Background of the invention

This invention relates to photoconductors, and more particularly to photoconductors consisting of cadmium sulphide, cadmium selenide, cadmium telluride or solid solutions thereof, to which are incorporated a first impurity consisting of an element of Group I*b* of the periodic table, and a second impurity consisting of at least one member selected from a group consisting of thallium, tin, lead, antimony and bismuth, said photoconductors being especially suitable for use in image pick-up tubes of high sensitivity and the like.

Heretofore, photoconductors have been used in a variety of applications including exposure meters for cameras, automatic on and off controllers, various control devices, image pick-up tubes, photoamplifiers, and the like. All of these photoconductors require materials having as high a photosensitivity as possible. Such materials having high photosensitivity are cadmium sulphide, selenium compounds, tellurium compounds or mixtures or solid solutions of two or more of said materials. Known photoconductive devices utilizing any one of these materials comprise an insulating material and a photoconductor essentially consisting of said photoconductive material. The photoconductor of this device is prepared by forming a monocrystalline film of said photoconductive material, or by sintering a powder of a photoconductive substance or the photoconductive substance is formed by sputtering or vacuum deposition technique. More particularly, in a practically employed method, cadmium selenide, 10% by weight of cadmium chloride based on the weight of cadmium selenide, and 0.001%, by weight, of copper chloride are concurrently vapor deposited onto a quartz glass plate, and the vapor deposited glass plate is then fired at a temperature of 500% C. for one hour in a nitrogen atmosphere, thus producing a photoconductor. A counter electrode, for example an indium plate, was mounted on the photoconductor and a measurement was made. The photoconductor had highly sensitive characteristics, that is, the ratio between the photo-current and the dark current was more than 1000 at 1000 luxes.

Of these various characteristics of the photoconductor, the slope of the curve representing intensity of illumination viz photoelectric characteristic (hereinafter will be designated as gamma) differs greatly from one product to the other and generally had values of 0.5 to 1.0, or from 0.7 to 0.8, on the average. Thus it was difficult to obtain photoelectric conductors having a constant characteristic. The characteristics of photoconductive materials consisting of sulphide or selenide of cadmium were greatly influenced by their methods of preparations. Although it has been said that it is caused by a very small amount of excessive or insufficient amount of negative ion components, from the standpoint of chemical quantum theory, this hypothesis has not yet been confirmed. Thus, an unavoidable variation in the value of gamma results. Further the gamma characteristic of a photoconductor is very important, and various gamma characteristics are required dependent upon the field of use of photoconductors as will be discussed hereunder. For example, when photoconductors are utilized as exposure meters built in camera bodies they are often connected to interlocking mechanisms comprising diaphragm systems each consisting of an electric source, the size of which in the camera is greatly limited but is required to generate a predetermined voltage, a predetermined ammeter and a predetermined circuit. Even if the bright resistance value under a constant intensity of illumination and the dark resistance value of the photoconductor employed in the exposure meter satisfy specified values, in photoconductors having different values of gamma as the bright resistance values vary under the higher and lower intensity of illumination of the constant illumination it would be impossible to provide a suitable exposure for a camera under these higher or lower illuminations. Although it is possible to compensate to some extent for slight variations in the dark and light resistance values which differ somewhat from the specified values by the provision of a compensating circuit, it is not possible to provide different compensating circuits for different values of gamma because of complexity and bulkiness of the circuit.

Further when employing photoconductors mentioned above, for example cadmium selenide, it is recognized that the value of gamma of the intensity of illumination viz. photoelectric current characteristic will become larger than unity in a certain range of light intensity and temperature when two bound levels of trapping centers are formed due to the trapping center caused by the imperfection in selenium and the trapping center caused by the imperfection in the cadmium. Further in cadmium selenide which is activated by an element, copper for instance of the Group I*b* of the periodic table which is the common means for improving the photoelectric sensitivity, the value of gamma of the intensity of illumination viz. photoelectric current characteristic will become larger than unity in a certain range of the intensity of light and the temperature when two bound levels are formed due to the imperfection in selenium and the recombination center mainly due to copper.

Thus, in cadmium selenide and cadmium sulphide which were prepared by the conventional method of manufacturing, the value of gamma was not uniform due to the fact that it was difficult to obtain products having bound levels at constant positions as above described.

Summary

The principal object of this invention is to obviate various difficulties mentioned above and according to this invention it is possible to select the value of gamma with a reproducibility commensurate with the field of application, whereby to provide photoconductors having any desired values of gamma larger than unity by incorporating a suitable impurity or impurities.

A further object of this invention is to prepare photoconductors having excellent characteristics even when impressed with high voltages by employing particularly specified treating temperatures.

A still further object of this invention is to provide photoconductors of high sensitivity and having a gamma equal to or higher than unity at low brightness and which are especially suitable for use in image pick-up tubes by utilizing clearly defined value of the impurity.

In the drawing

Detailed description

Figures 1, 2, 3:
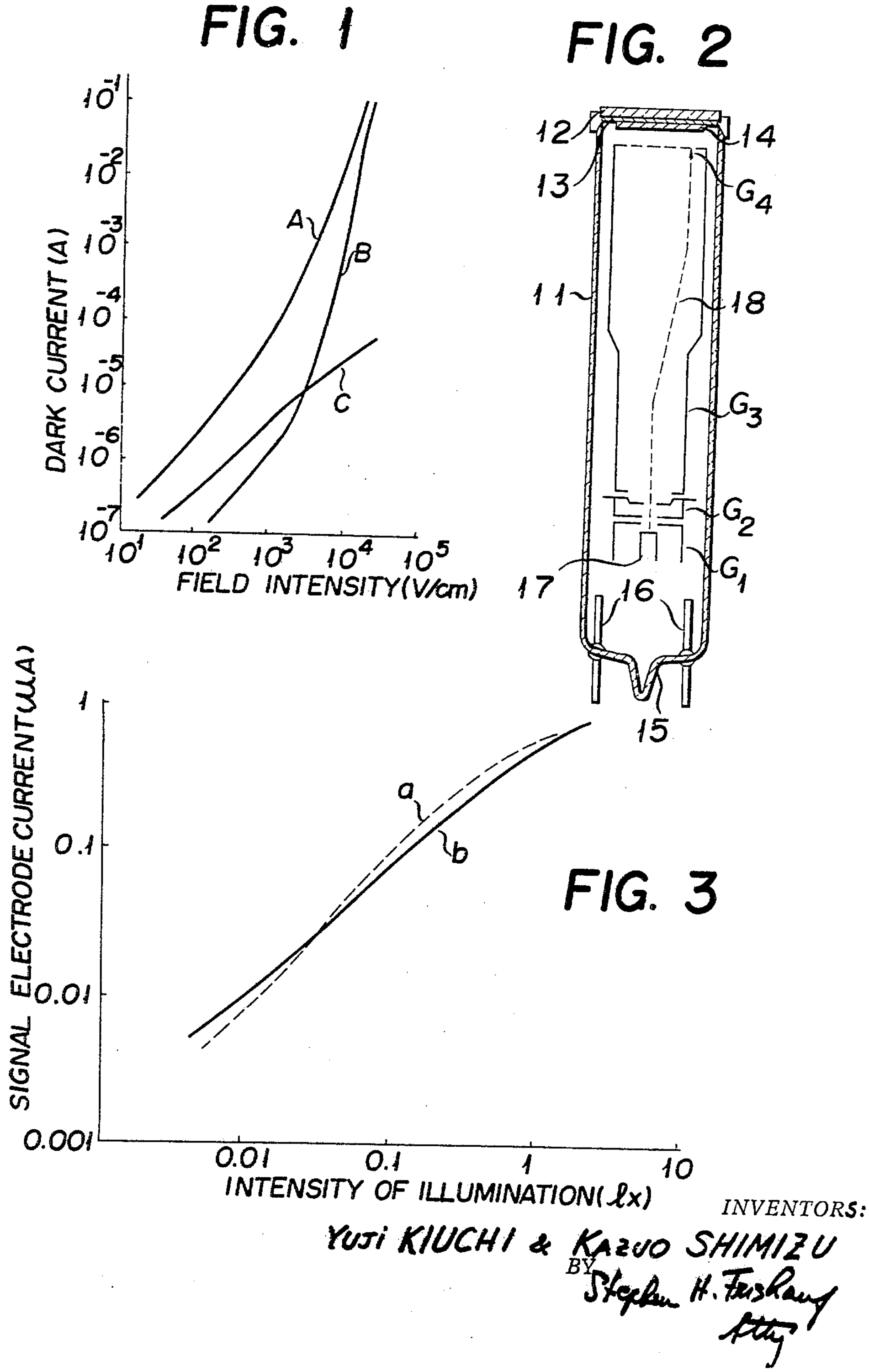
FIG. 1 is a plot to illustrate the relation between the dark current and field intensity of various photoelectric conductors of this invention.
FIG. 2 is a diagrammatic longitudinal sectional view of an image pick-up tube utilizing a photoconductor film embodying this invention.
FIG. 3 is a plot representing the relation between signal electrode current and the intensity of illumination at the photoelectric surface of the pick-up tube shown in FIG. 2.

We have found that a plurality of shallow trapping centers can be formed near the bound level due to the imperfection in selenium by incorporating thallium, for example into photoconductors such as cadmium selenide or cadmium sulphide or the like. It was also found that the density of said trapping centers can be controlled relatively readily to any desired value by increasing or decreasing the quantity of incorporation of thallium.

The features of the invention which are believed to be novel are set forth with particularity in the appended claims. The invention itself, however, as to its organization together with further objects and advantages thereof, may best be understood by reference to the following description taken in connection with the accompanying drawing.

Following is one example of the photoconductor embodying this invention.

0.02%, by weight, of an element of Group I*b*, for example copper chloride (calculated as metallic copper), acting as a first impurity, and 0.5 weight percent of thallium, acting as a second impurity were incorporated into a photoconductor material, for example, cadmium selenide. Further cadmium chloride was added to act as the flux, and water of the quantity necessary to obtain a paste was added and then the mixture was kneaded. Thereafter, the mixture was coated upon a substrate, a glass plate for example, to form a layer of a photoconductor. Then the layer was dried and then fired in argon atmosphere at a temperature of 600° C. for 10 minutes to prepare a photoconductor. An electrode made of indium, for example, was provided on said photoconductor and the intensity of illumination viz. photoelectric current characteristic was measured and the value of gamma of the photoconductor was found to be 1.60.

In the above manufacturing procedures, the quantity of thallium was varied to prepare many types of photoconductors and their intensity of illumination viz. photoelectric current characteristics were measured. As a result it was found that the values of gamma of these photoconductors were included in a range of from 0.6 to 1.6. Further when the same quantity of thallium was incorporated it was found that the reproduceability of the characteristics of the novel photoelectric conductor was so excellent that they are suitable for mass production.

As has been described above, according to this invention a photoelectric conductor of the cadmium selenide series can be obtained by incorporating thereto a first impurity consisting of an element of the Group I*b* and a second element consisting of thallium. The quantity of thallium incorporated determines the desired value of gamma and greatly decreases the difference between characteristics so that the photoelectric conductor embodying this invention is quite suitable for mass production. Further, by suitably selecting conditions the impurities do not affect in any way other electrical characteristics.

Although in the above example a first impurity consisting of an element of the Group I*b* and a second impurity consisting of thallium were incorporated into cadmium selenide to form a photoelectric material, similar results could be obtained when utilizing cadmium sulphide or a solid solution of cadmium selenide and cadmium sulphide as the photoconductive material and a mixture of several elements of the Group I*b* and one or more of tin, antimony, bismuth and lead as the impurity.

For example, in one modification, 0.05%, by weight of an element of the Group I*b*, i.e. silver chloride (calculated as metallic silver) and 0.4%, by weight, of lead were added to a solid solution of a photoelectric conductor consisting of 15%, by weight, of cadmium sulphide and 85%, by weight, of cadmium selenide. Further, cadmium chloride acting as the flux and water were incorporated and the mixture were grounded and mixed to prepare a dispersed liquid having a viscosity suitable for spraying. Thereafter the solution was sprayed onto a suitable substrate, a glass plate for example, to form a film of the photoelectric conductor. Then the layer was dried and fired in a nitrogen atmosphere at 600° C. for 10 minutes to produce the photoelectric conductor. An electrode of a suitable material, indium for example, was provided on the photoconductor to measure the intensity of illumination viz. photoelectric characteristic. It was found that the value of gamma of this photoelectric conductor was 1.1.

While in the above described embodiments, a method of preparing a photoelectric conductor was described wherein a powder of the photoelectric conductor was coated or sprayed and then fired, it will be understood that the photoelectric conductor may also be prepared from a film of monocrystalline or by other suitable methods such as vacuum deposition, sputtering and the like. Among these various methods the method wherein the photoelectric conductive material is vapor deposited and then fired provided easiest control of the gamma characteristic.

Further, while in the above described embodiments an element of the Group I*b*, and thallium, tin, lead, antimony or bismuth were incorporated into the photoelectric conductive material, respectively as the first and second impurities in order to form a layer of the photoelectric conductor layer, it should be understood that at first the layer of the photoelectric conductor may be deposited, then said impurities may be deposited in layers by vapor deposition technique for example, and finally the assembly may be heat treated to cause said impurities to diffuse into the photoconductor. In this case too, the same merit can be obtained as in the foregoing examples.

The above described photoelectric conductors have a high sensitivity or photocurrent viz. dark current ratio of more than 1000 at 1000 luxes, and the layer of the photoelectric conductor has a high dark resistance and a high photosensitivity under a relatively low applied voltage. However, where a sufficiently high electric voltage is applied which creates a high mean electric field of more than $2 \times 10^3$ v./cm., the dark resistance decreases rapidly to greatly increase the dark current as shown in curve A in FIG. 1, which, in turn causes decrease of the photosensitivity so that it is impossible to use it in practical applications. In order to obviate this problem there has been proposed a method of manufacturing a photoelectric conductor layer wherein a photoelectric conductive material is first vapor deposited and the deposited layer is then heat treated in an atmosphere of sulfur vapor at a temperature of about 400° C. for one hour. The dark current of this layer is very small under low electric field as indicated by a curve B in FIG. 1. However as the electric field increases the dark current increases rapidly. It is said that this is due to the space charge limiting current, but the practical range in which the dark current is small is still narrow.

The following example, discloses a method of preparing a photoelectric conductor wherein the above described photoelectric conductor embodying this invention is heat treated in an inert atmosphere containing sulfur, selenium, tellurium or two or more of them at a temperature of from 450° to 950° C. for less than 5 minutes.

The layer of photoelectric conductor may be prepared as follows:

Cadmium selenide, halides, cadmium chloride and copper chloride for example, and thallium are co-vapor deposited upon a suitable substrate, a quartz glass plate for example and then heat treated in an inert atmosphere containing selenium for example, a nitrogen atmosphere at a temperature of 800° C. for one minute to obtain a photoelectric conductor.

A counter electrode was mounted on the photoelectric conductor thus obtained and the dark current viz. electric field strength characteristic was measured. The result of the measurement is plotted as a curve C in FIG. 1. As can be noted from this characteristic curve at an electric field intensity of more than $2\times10^4$ v./cm., the characteristic is nearly straight.

The photoelectric conductor of this example has superior photosensitivity than known photoelectric conductors of the same type. The test result showed that the variation in the photoelectric current of the photoelectric conductor according to this example was within $\pm5\%$, or the stability thereof was greatly improved when compared with very unstable characteristics of the prior art. More specifically, the characteristic of prior art photoelectric conductors varied gradually over a considerable range. For example, the value of the photoelectric current varied $\pm15\%$ in one month. Moreover as the layer of the photoelectric conductor provided on the substrate is heated extremely quickly by heat radia tion in the heat treating surface when the assembly is subjected to a high temperature heat treatment for a short interval peeling off of the photoelectric conductive layer due to the difference between the expansion coefficients of the layer and substrate as well as chemical reaction due to high temperature between a conductor layer, for instance and the layer of the photoelectric conductor rarely happen. In addition, the high temperature treatment of short period causes perfect evaporation from the photoconductive material of a halogenide, for example cadmium chloride which is utilized to act as the flux which greatly improves the stabilization of the characteristics of the photoelectric conductor. Further, the presence of oxygen on the surface the layer of the deposited photoconductive material has resulted in a very unstable characteristic. However, the heat treatment of short duration in an inert atmosphere containing sulfur selenium and the like is effective to remove oxygen which causes unstable characteristics by causing it to react with sulfur or selenium whereby to greatly stabilize the characteristic of the photoelectric conductor.

While in the foregoing examples heat treatments were carried out in an inert atmosphere containing selenium, depending upon the photosensitivity, spectral characteristic and the like, heat treatment may also be carried out with the same results in an inert gas or air containing sulfur, tellurium or their mixture in addition to selenium.

Further, although heat treatment was carried out in an inert gas atmosphere at a temperature of 800° C. for one minute, heat treatment can also be carried out at a tempertaure within a range of from 450° to 950° C. When the treating temperature is high, heat treating periods of more than 5 minutes would result in a remarkable growth of secondary grains in the treated layer of the photoelectric conductor, thus causing a change in the characteristic as well as cracks in the surface of the layer. When the treating temperature is lower than 450° C., the stability of the characteristic becomes poor whereas with the treating temperature of more than 950° C., formed layer of the photoelectric conductor would be vaporized and the substrate, for example a glass sheet would be deformed. By these reasons it is most advantageous to treat the photoconductive layer at a temperature of from 450° to 950° C. for a period of less than 5 minutes.

Although in the above described embodiments the photoelectric conductor material was deposited on the substrate by vapor deposition, it may also be deposited by coating or sintering a powder of the photoelectric conductor or by any other suitable method which can deposit the layer of photoelectric conductor.

Further, while in the above embodiments the photoelectric conductor was provided on a glass sheet, other suitable insulator plates may be substituted for the glass sheet.

In the following modifications, a modified photoelectric conductor which has a high sensitivity and is especially effective at a low intensity of brightness is used as a photoconductive membrane of an image pick-up tube.

The photoconductive material which is used in image pick-up tubes which are normally termed as vidicon tubes are required to have a spectral sensitivity analogous to the visual sensitivity curve, a high photoconductivity, a dark resistance of more than $10^{12}$ ohm-cm. and a residual-image time of less than $\frac{1}{30}$ second. However, prior photoconductive substances, for example, antimony trisulfide, selenium, lead oxide and the like have poor sensitivity. Especially the sensitivity at the red portion is too low to use for pick-up tubes for general use, especially for color television.

This modification contemplates to eliminate above described difficulty by utilizing cadmium sulphide, cadmium selenide and the like. Especially, cadmium selenide which is subjected to a suitable heat treatment and shaped into a suitable thickness has good sensitivity over a wide frequency range from the visible region to the near infrared region.

Although in the above embodiments thallium or copper was incorporated into cadmium selenide in order to obtain high quality photoelectric conductive substances the slope of a characteristic curve representing the relation between the brightness of the photoconductor surface and the signal electrode current of gamma is less than 0.84 at a brightness of the photoelectric surface is less than one lux. This value of gamma is too low so that the sensitivity at low illumination is not sufficient.

According to this invention, in order to obtain photoconductive films of high conductivity cadmium selenide containing one or more members selected from a group consisting of gold, silver and copper, and one or more members selected from tin, lead, thallium, antimony and bismuth is used as the photoconductive substance. In this case gold, silver and copper are designated as impurities of a first group whereas tin, lead, thallium, antimony and bismuth as impurities of a second group. It is possible to make the value of gamma equal to or larger than unity by incorporating from 0.0006% to 0.5% by weight of the impurity of the first group and from 0.005 to 5%, by weight of the impurity of the second group into cadmium selenide.

Referring now to FIG. 2 a transparent circular disc shaped face plate 12 is provided at one end of a housing 11 and a translucent photoconductor film 14 is secured to the inner surface of the face plate through a transparent signal electrode 13. At the other end of the housing opposite to said face plate 12 is formed a stem 15 through which a plurality of lead wires 16 extend. An electron gun comprising grid electrodes $G_1$–$G_4$ and a cathode electrode 17 is located at a predetermined position within the housing 11 and a low speed electron beam 18, emitted from the electron gun, is deflected by a deflecting system, not shown, to scan across the photoconductor film 14.

The photoconductive film 14 in this embodiment is deposited and treated as follows. The signal electrode 13 is deposited beforehand on one surface of the face plate 12 and the assembly is then put into a vacuum tank evacuated to more than $10^{-4}$ mm. mercury together with a quartz crucible containing cadmium selenide. The crucible is heated by a tungsten heater to vapor deposit cadmium selenide onto the signal electrode 13. In this case, the cadmium selenide is incorporated with 20% of cadmium chloride, 0.1% of copper and 1% of thallium. The layer of cadmium selenide obtained in this manner is then sintered by being heated in an inert gas atmosphere, such as nitrogen and the like at a temperature of 600° C. for 10 minutes and is then transferred into selenium vapor to effect heat treatment at a temperature of 500° C. for 30 minutes to complete the photoelectric conductive film 14.

A curve A in FIG. 3 shows the signal electrode current viz. intensity of illumination characteristic of an image pick-up tube utilizing the photoelectric conductive film 14 obtained by the above mentioned process steps, while a curve B in the same figure represents the corresponding characteristic of cadmium selenide which is treated similarly but contains only copper or thallium. As can be clearly noted from these curves A and B the gamma characteristic at low illumination of the photoelectric conductor embodying this invention has been greatly improved over the prior art photoelectric conductor and an increase of the value of gamma above unity is caused by the fact that impurities of said first and second groups create two types of impurity levels of different characters respectively at suitable positions.

While in the above described embodiments inclusion of copper and thallium has been described, it should be understood that this invention is not limited to such specific examples and the excellent characteristics could be expected by selecting a suitable combination of impurities belonging to said first and second groups.

Thus, if either too much or too little of the impurities is used photoelectric conductors of high sensitivity suitable for use in pick-up tubes will not be obtained. As mentioned hereinabove, a content of from 0.0006% to 0.5% is suitable for the first group and from 0.005% to 5% for the second group.

It is to be understood that the thickness of the photoconductor layer is adjusted from 0.1 to 10 microns according to the desired spectral sensitivity. Further, it may also be possible to deposit a porous film made of antimony trisulphide and the like, for example, on the photoconductor film in order to prevent secondary electron emission from the photoconductor film during operation.

While certain particular examples of photoelectric conductor have been disclosed for the purpose of illustration and description, it is to be understood that various changes can be made therein without departing from the spirit and scope of the invention.

What is claimed is:

1. A photoelectric conductor comprising:

a photoelectric material selected from the group consisting of cadmium sulphide, cadmium selenide, cadmium telluride and solid solutions containing at least two of said compounds;

a first impurity consisting of at least one member selected from the elements of Group I*b* of the Periodic Table; and a second impurity consisting of at least one member selected from the group consisting of thallium, antimony and bismuth.

2. The photoelectric conductor according to claim 1 wherein said cadmium selenide contains from 0.0006 to 0.5%, by weight, of a member selected from a group consisting of gold, silver, copper and mixtures thereof which acts as a first impurity and from 0.005 to 5%, by weight, of a member selected from a group consisting of thallium, antimony, bismuth and mixtures of at least two of them which acts as a second impurity.

3. The photoelectric conductor according to claim 2 wherein said photoelectric conductor is utilized as a photoconductor film of an image pick-up tube comprising a face plate, a signal electrode mounted on the inside surface of said face plate, a photoconductor film superposed upon said signal electrode and an electron gun disposed opposite to said face plate.

References Cited

UNITED STATES PATENTS

| | | | |
|---|---|---|---|
| 2,310,002 | 2/1943 | Van Geel et al. | 313—106 X |
| 2,809,323 | 10/1957 | Jacobs et al. | 250—211 X |
| 3,065,515 | 11/1962 | Antes | 252—501 X |
| 3,191,045 | 6/1965 | Colman | 250—211 |
| 3,303,344 | 2/1967 | Simms | 250—211 |

WALTER STOLWEIN, Primary Examiner

U.S. Cl. X.R.

250—211; 252—501